(12) United States Patent
Glazer

(10) Patent No.: US 9,369,534 B2
(45) Date of Patent: Jun. 14, 2016

(54) SYSTEM AND METHOD OF CONSISTENT INTERNET WEB SITE BANNERS THAT PROVIDE PORTAL-LIKE FUNCTIONALITY

(75) Inventor: Avram Glazer, Rochester, NY (US)

(73) Assignee: Zap.com Corporation, Rochester, NY (US)

( * ) Notice: Subject to any disclaimer, the term of this patent is extended or adjusted under 35 U.S.C. 154(b) by 1993 days.

(21) Appl. No.: 12/314,184

(22) Filed: Dec. 5, 2008

(65) Prior Publication Data
US 2009/0164317 A1    Jun. 25, 2009

Related U.S. Application Data

(62) Division of application No. 09/545,875, filed on Apr. 7, 2000, now Pat. No. 7,469,222.

(60) Provisional application No. 60/128,417, filed on Apr. 8, 1999.

(51) Int. Cl.
*G06Q 30/02* (2012.01)
*H04L 29/08* (2006.01)
(Continued)

(52) U.S. Cl.
CPC ............ *H04L 67/20* (2013.01); *G06Q 30/0239* (2013.01); *G06Q 30/0254* (2013.01);
(Continued)

(58) Field of Classification Search
USPC ........................................ 705/34, 14.44, 14.4
See application file for complete search history.

(56) References Cited

U.S. PATENT DOCUMENTS 5,929,927 A    7/1999    Rumreich et al.
5,933,811 A    8/1999    Angles et al.
(Continued)

FOREIGN PATENT DOCUMENTS

EP    1074929    7/2001
WO    WO 9909744 A1 *    2/1999    ......... H04N 7/17318
WO    WO 0101275    1/2001

OTHER PUBLICATIONS

Cash Prizes Build Traffic for Ad-Supported Web Games players hunt for clues, see sponsors ads over and over. (1995). Phillips Media Group's Interactive Marketing News, 1. Retrieved from http://search.proquest.com/docview/202829247?accountid=14753.*

(Continued)

*Primary Examiner* — Scott Zare
(74) *Attorney, Agent, or Firm* — Woods Oviatt Gilman LLP; Dennis B. Danella, Esq.

(57) ABSTRACT

In a continual and integrated approach to Internet banner display rights, a party acquires long-term banner display rights on published web sites of other entities, in a manner so as to ensure full and continual control over the content, look and functionality of the acquired banner space. A variety of different forms of compensation can be provided to the entities which publish the web sites, in exchange for the acquisition of the banner space. The Internet banner is multifunctional, utilizing menus, links and similar user interface items, to operate as a portal to a variety of informational content and services, such as e-commerce, search engines, and the like. These services might be provided by the party which owns the banner space, or by third parties. The banners which appear in the spaces acquired from multiple publishing sites are organized into a networked system, to provide users with integrated and consistent access to the available services. The entity which provides the content and services through the banners can enter into arrangements with end users, to provide incentives for users to access the banners as well as enhance the users' experience.

16 Claims, 5 Drawing Sheets

(51) Int. Cl.
  *G06Q 30/06* (2012.01)
  *G06Q 40/04* (2012.01)
  *H04L 29/06* (2006.01)

(52) U.S. Cl.
  CPC ........ *G06Q30/0273* (2013.01); *G06Q 30/0277* (2013.01); *G06Q 30/0601* (2013.01); *G06Q 30/0641* (2013.01); *G06Q 40/04* (2013.01); *H04L 29/06* (2013.01); *H04L 67/36* (2013.01); *H04L 69/329* (2013.01)

(56) References Cited

U.S. PATENT DOCUMENTS

| | | | |
|---|---|---|---|
| 5,937,392 A | | 8/1999 | Alberts |
| 5,948,061 A | * | 9/1999 | Merriman ..................... 709/219 |
| 6,006,252 A | * | 12/1999 | Wolfe ........................... 709/203 |
| 6,014,698 A | | 1/2000 | Griffiths |
| 6,026,368 A | | 2/2000 | Brown et al. |
| 6,055,573 A | | 4/2000 | Gardenswartz et al. |
| 6,118,449 A | | 9/2000 | Rosen et al. |
| 6,141,010 A | | 10/2000 | Hoyle |
| 6,185,587 B1 | | 2/2001 | Bernardo et al. |
| 6,237,022 B1 | * | 5/2001 | Bruck ..................... H04L 29/06 709/200 |
| 6,285,987 B1 | | 9/2001 | Roth et al. |
| 6,317,784 B1 | | 11/2001 | Mackintosh et al. |
| 6,336,131 B1 | * | 1/2002 | Wolfe ........................... 709/203 |
| 6,338,094 B1 | | 1/2002 | Scott et al. |
| 6,341,305 B2 | | 1/2002 | Wolfe |
| 6,343,274 B1 | | 1/2002 | McCollom et al. |
| 6,442,590 B1 | | 8/2002 | Inala et al. |
| 6,452,609 B1 | | 9/2002 | Katinsky et al. |
| 6,487,538 B1 | * | 11/2002 | Gupta ..................... G06Q 30/02 705/14.66 |
| 6,496,843 B1 | | 12/2002 | Getchius et al. |
| 6,643,696 B2 | | 11/2003 | Davis et al. |
| 6,901,433 B2 | * | 5/2005 | San Andres et al. .......... 709/216 |

OTHER PUBLICATIONS

Bellm, M. Two ways to find product information on the Web. Control Engineering. 45, 7, 56, May 1998. ISSN: 00108049.*

* cited by examiner

SYSTEM AND METHOD OF CONSISTENT INTERNET WEB SITE BANNERS THAT PROVIDE PORTAL-LIKE FUNCTIONALITY

This application is a divisional of U.S. patent application Ser. No. 09/545,875, filed Apr. 7, 2000, now issued as U.S. Pat. No. 7,469,222, which claims the benefit of provisional U.S. patent application No. 60/128,417, filed Apr. 8, 1999, the contents of which are incorporated herein by reference.

FIELD OF THE INVENTION

The present invention is directed to mechanisms via which computer users gain access to information and services provided in a networked computer environment, such as the Internet, and more particularly to a comprehensive approach to providing consistent access across a variety of Internet web sites.

BACKGROUND OF THE INVENTION

The ever-expanding popularity of the Internet and other forms of networked computer systems has resulted in an enormous wealth of information and services becoming available to the average computer user. At the most basic level of functionality, the user can instruct a browser application to connect to a particular web site, to view information stored on a web page at that site and/or partake of services provided at the site, such as trading stocks, purchasing merchandise, participating in surveys, etc. At this level of operation, the user's experience is limited to the particular subject matter provided by a web page at the site to which the browser is connected. In order to view a different type of subject matter, the user must command the browser to connect to another site, either by explicitly entering the address of a new site, if it is known, or by activating a link to another site which is embedded in the contents of the web page currently being viewed.

In an effort to enhance the user's experience, various mechanisms have been employed which provide the user with information from multiple Internet sites in the context of a single web page. One such mechanism is known as a banner. Generally speaking, a banner comprises a portion of a web page whose content is determined by a source which is separate from the source of the underlying content of the web page to which the browser has connected. The separate source might be a different server, or a different file on the same server. Typically, the content of the banner is provided by an Internet site which is different from the site that functions as the host for the web page. As such, the banner can be used to provide additional information to the user, beyond that which forms the intrinsic contents of the current web page to which the latest connection was made.

While the use of banners has increased the dimensions of the information and/or services provided to the computer user within the context of a single web page, the approaches which have been employed to date in the deployment of this technology have not provided a consistent user experience. For example, one of the principal uses for banners has been as a medium for advertisements. Typically, the entity which is publishing a web page may agree to lease banner space to a third party, which can be used for an advertisement of that third party's web site. However, this space may only be leased for a limited period of time. At the end of that time, a different party may acquire the lease of the banner space, or the publishing entity may decide to terminate the banner space. Consequently, a party which employs banners as a form of advertising is not guaranteed continuous access to a popular site for such a purpose.

Furthermore, if a user comes to rely upon banners as a form of access to additional web sites, the lack of continuity in their content, and/or availability, may become a source of frustration.

Accordingly, it is desirable to provide a more consistent and comprehensive approach to the use of banners as a source of access to information and services on the Internet and other networked computer systems. To this end, it is further desirable to provide the user with access to a variety of different types of content through the auspices of a banner-like mechanism, and the ability to personalize the different types of content that are provided via the banner.

SUMMARY OF THE INVENTION

In accordance with the present invention, the foregoing objectives are achieved by means of a continual and integrated approach to Internet banner display rights, coupled with a multi-function banner that is configurable by the user. In a first aspect of the invention, a party acquires long-term banner display rights on published web sites of other entities, in a manner so as to ensure full and continual control over the content, look and functionality of the acquired banner space. A variety of different forms of compensation can be provided to the entities which publish the web sites, in exchange for the acquisition of the banner space. As a second aspect of the invention, the Internet banner is multifunctional, utilizing menus, links and similar user interface items, to operate as a portal to a variety of informational content and services, such as e-commerce, search engines, and the like. These services might be provided by the party which owns the banner space, or by third parties. In another aspect of the invention, the banners which appear in the spaces acquired from multiple publishing sites are organized into a networked system, to provide users with integrated and consistent access to the available services.

In another aspect of the invention, the entity which provides the content and services through the banners can enter into arrangements with end users, to provide incentives for users to access the banners as well as enhance the users' experience.

The foregoing features of the invention, and the advantages provided thereby, are described in detail hereinafter with reference to various exemplary embodiments illustrated in the accompanying drawings.

DETAILED DESCRIPTION

To facilitate an understanding of the concepts which underlie the present invention, it is described hereinafter with reference to its application in the international network of interconnected computers known as the Internet, specifically that portion of the Internet identified as the World-Wide Web, via which users gain access to various types of content, e.g. information and services, through web pages. It will be appreciated, however, that the principles of the invention are applicable to other networked computer systems that are accessed by users to obtain information and/or services as well.

Figure 1:
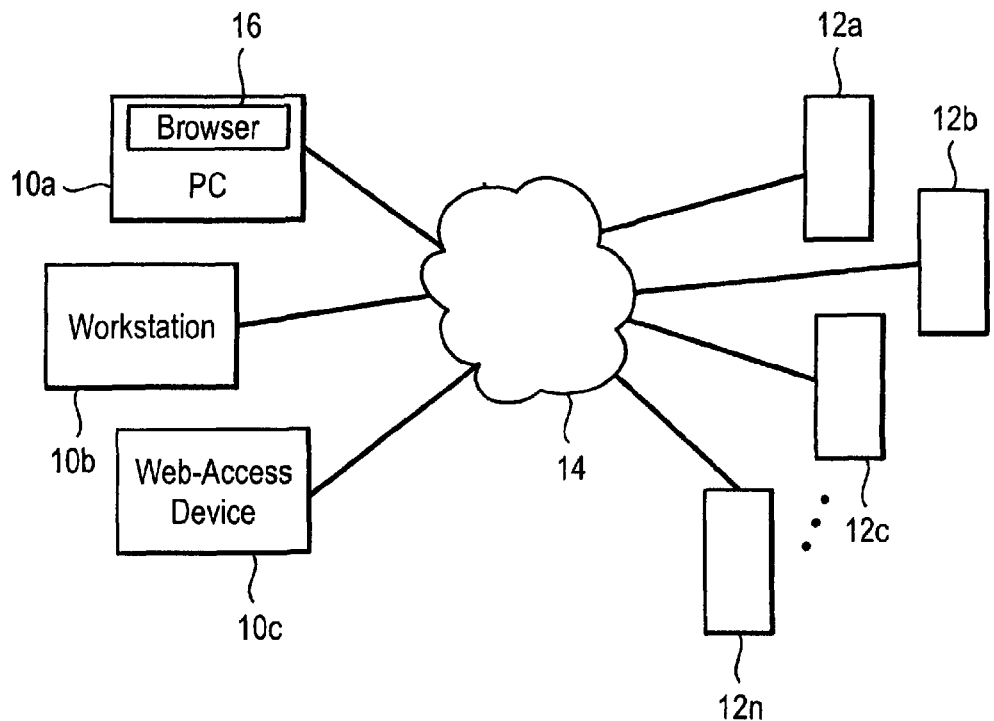
FIG. 1 is a general block diagram of a networked computer system in which the present invention can be implemented.

A general overview of a networked computer system in which the present invention can be implemented is illustrated in FIG. 1. In essence, the computer system enables individual users of communication devices 10, including personal computers 10a, workstations 10b, web access devices 10c, and the like, to view informational content and employ services provided by various servers 12a-12n. The communication devices 10 are connected to the servers 12 by means of a suitable communications network 14, such as the Internet. To view the content and interact with the services provided by the servers, the devices 10 run a browser application program 16. At the servers 12, the available content and services are stored on suitable storage media, such as magnetic or optical disk drives, in a format that is capable of being read by the browser applications, such as HTML or XML. Typically, each segment of information which can be accessed at once, e.g. file, is referred to as a web page, and has an associated Internet address. Thus, by entering a particular address in a browser application, the user is presented with one page of information that is stored at a particular server. A collection of web pages that relate to a common topic and are interlinked with one another form a web site.

Figure 2:
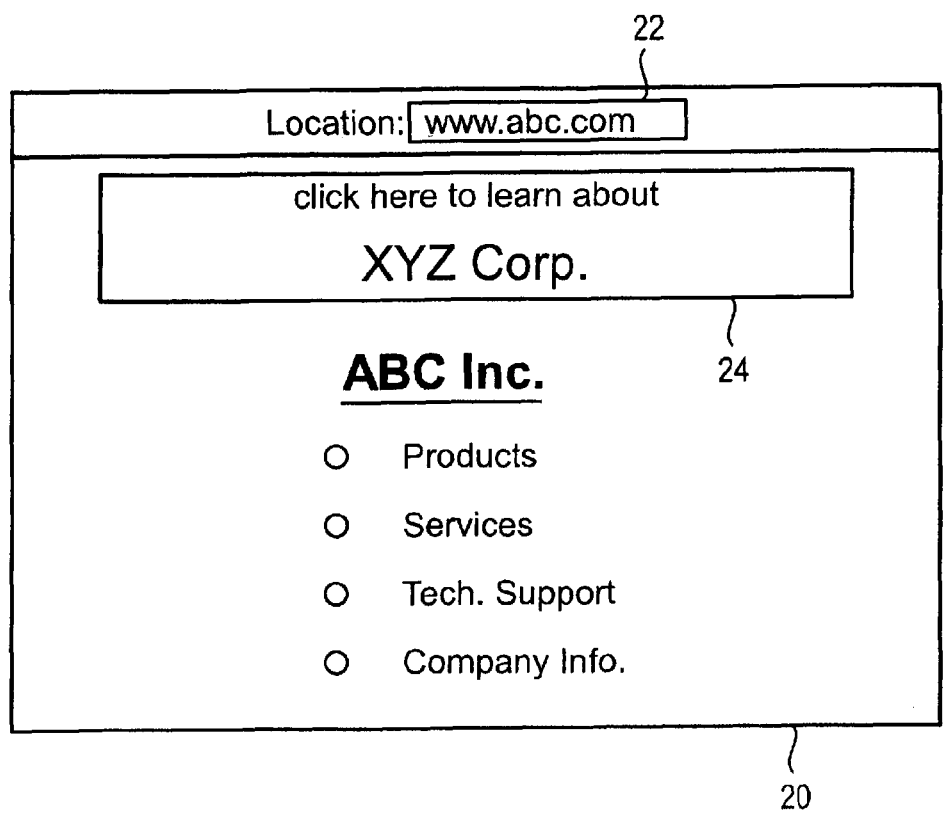
FIG. 2 is an illustration of a web page containing a banner.

To inform users about information available at multiple different web sites, without requiring the user to separately view the web pages of the different sites, banners are commonly employed. In general, a banner comprises a portion of a web page from one site that receives content from a different site. If the web pages comprise HTML documents, for instance, a banner can appear within a frame that is incorporated into the HTML document of the hosting web page. An example of a web page containing a banner is illustrated in FIG. 2. The main portion of the contents of the web page 20 displays information associated with the web site whose address has been entered in a window 22 of the browser application. In the illustrated example, the web page is associated with a web publisher, ABC Inc., whose web site may be hosted on a first server 12a. The main portion of the web page displays information pertaining to the products and services of that company. Appearing on the web page is a banner 24. This banner is associated with a different web site, in this case the site of company XYZ Corp., whose site may be hosted on a different server 12c. The banner is displayed by means of instructions within the HTML code for the web page 20. These instructions indicate the position where the banner is to appear on the page, its size, and a reference to the source of the information for the banner, in this case an address associated with the server 12c. At that address, a file containing additional HTML code specifies the particular contents of the banner 24.

In accordance with one aspect of the present invention, the arrangement between the party which controls the content of a banner, such as XYZ Corp. in the foregoing example, and another entity which publishes a web site, e.g. ABC Inc., is one by which XYZ Corp. acquires a contractually guaranteed right of access to a defined amount of banner space on the pages of ABC Inc.'s web site. The right of access to the banner space can be established on a renewable basis, e.g. successive renewable terms of one year each. Alternatively, the contractual arrangement could provide for display rights that are permanent in nature. In other words, as long as the publishing entity continues to provide a web site, the party with the acquired right has full and perpetual control over the content, look and functionality of the banner space on the publishing party's web site.

By entering into such an arrangement with a number of web publishing entities, the party which acquires such rights on each of their sites can form a network of integrated banners. All of the banners which are controlled by the acquiring party are branded with the identity of the party, for instance by displaying its logo and/or presenting a consistent look and feel that is associated with the party. For ease of reference throughout the remainder of this disclosure, the party which acquires such banner rights and controls the content of the banners will be referred to as the "banner party".

Various parameters which affect or control the display of the banner can be determined by the compensation that is provided to the publishing party in return for the banner rights. For instance, in one implementation, the type, size and/or location of the banner space that is made available to the banner party can be varied in dependence upon the amount or type of compensation that is provided to the web publisher. For example, a higher level of compensation may entitle the banner party to banner space which is located at the top of the web page, so that it is immediately visible whenever a user accesses the web page. Lower levels of compensation may be associated with placement of the banner space lower on the web page, such that a user may be required to scroll down the page before the banner becomes visible. In addition, or alternatively, the level of compensation can determine whether the banner party obtains exclusive rights to banner space on the web publisher's site, and if not what level of priority it has relative to other banners appearing on the site.

The level of compensation may also influence the frequency with which the banner space appears. For instance, a higher level may ensure that the banner appears on every page of the publishing entity's web site, whereas a lower level may only guarantee that the banner appears on the home page, or some other designated page, of the web site.

The size of the banner space could also be determined by the level of compensation, or by some other factor. For example, the size of the banner could be made dependent upon the resolution set by the server. The arrangement between the parties might specify that the banner should occupy a particular amount of area, e.g. 640×160 pixels. Alternatively, the arrangement can specify that, for a given resolution, the banner should occupy a certain percentage of the initial viewing area of a web page, e.g. 20 or 25%.

The compensation itself can take a variety of forms. For instance, it can be cash or its equivalent, stock in the company that acquires the banner space, or some combination of the two. Furthermore, it can be paid to the publishing entity in one lump sum, or in periodic payments for a designated duration. In the case of stock that is issued, it can become vested on a graduated basis over time for continued display rights.

Figure 3:
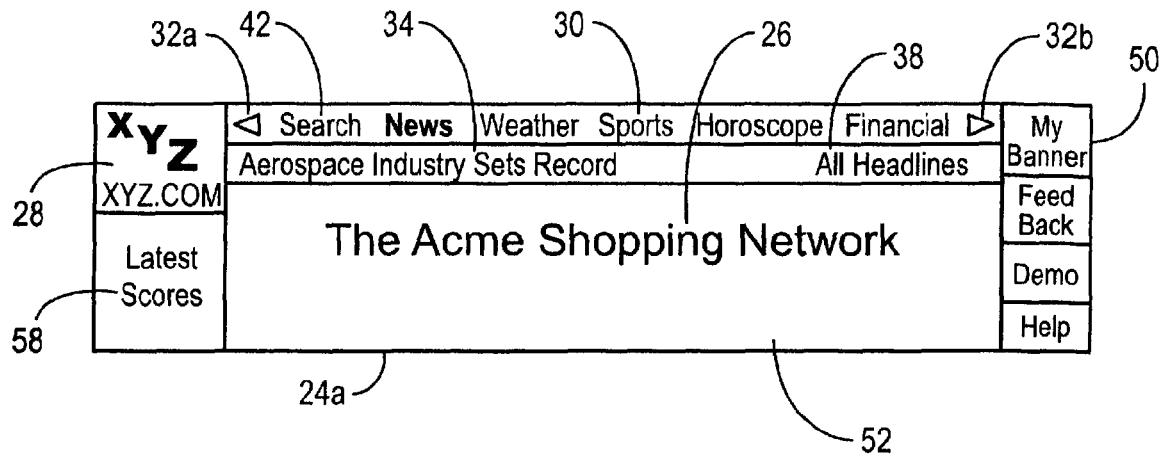
FIG. 3 is an illustration of a multi-function banner in accordance with the present invention.

Pursuant to another feature of the present invention, the banner provides access to multiple different services, to thereby function as a multi-site/multi-function portal for the user. An example of a banner which provides such features is illustrated in FIG. 3. Referring thereto, the central portion of the banner 24a may contain an advertisement 26 for the party which owns the banner space, or a third party which has leased advertising rights from the banner party, as in the illustrated example. The banner may also include a link 28 to the home page for the banner party's web site. The advertising may include information about promotions that are being sponsored by the advertising party, with possible links to appropriate web pages.

Another one of the capabilities provided by the banner is access to various categories of content available through the banner party. These categories are listed in a menu 30 across the top of the banner. If the number of categories is greater than the available space at the top of the banner, the menu can be scrollable by means of suitable control buttons 32a, 32b.

Figure 4:
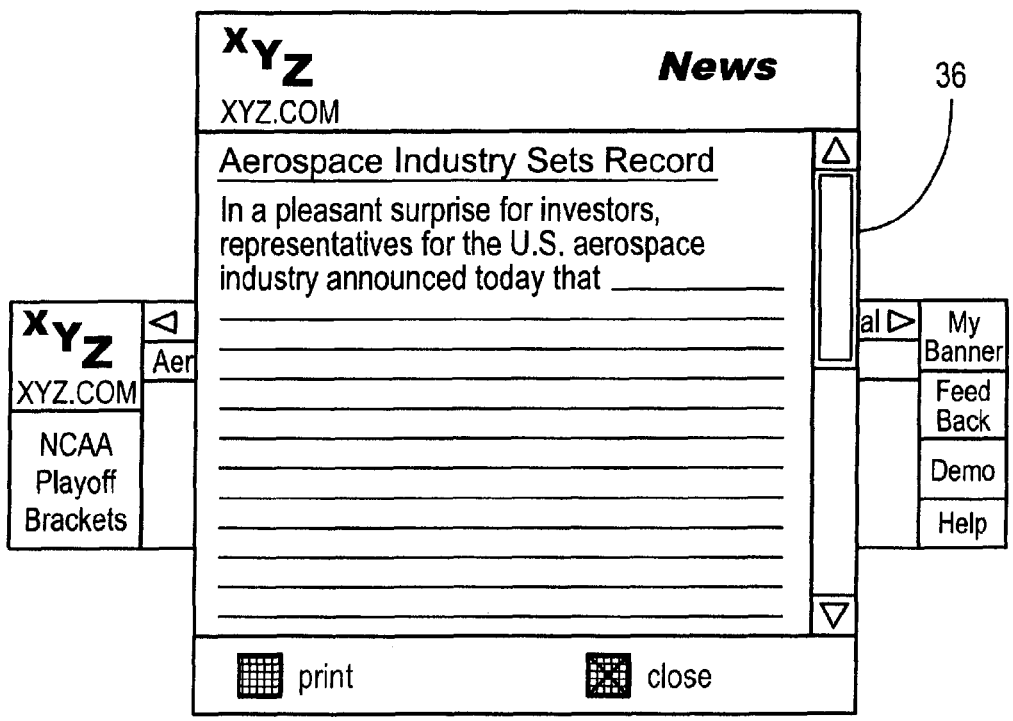
FIG. 4 is an illustration of a pop-up window which displays the contents of a story pertaining to a headline.

When a user selects any one of these content categories, a scrolling headline 34 of the items available in that category is displayed to the user. In the illustrated example, the user has selected the "News" category, and so the news headlines appear in the space 34. Each category might consist of about ten headlines, for example. The headlines are stored in a file that is downloaded when the user clicks on the associated category. Each headline in the file can appear for a few seconds, for the user to determine whether it is of interest, after which it is replaced by the next headline in that category. In essence, each headline comprises a link to the related news stories. By clicking on a headline of interest when it appears, a pop-up window 36 is displayed which contains the complete story under that headline, as shown in FIG. 4.

Figure 5:
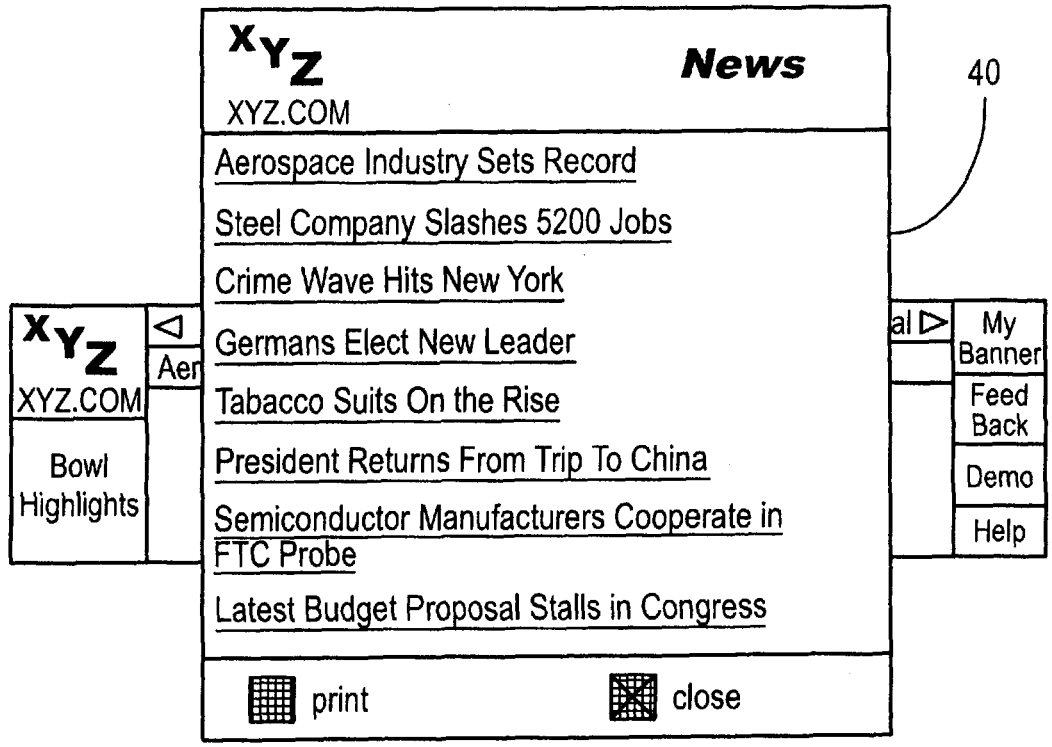
FIG. 5 is an illustration of an "All Headline" pop-up window.

A link 38 entitled "All Headlines" appears to the right of the scrolling headlines in the example of FIG. 3. By clicking on this link, the viewer can be presented with a pop-up window 40 which displays the contents of the file containing all of the headlines for that category, as shown in FIG. 5. From this window, the viewer can access any one of the items of content in that category. Hence, the viewer need not wait for a headline to scroll by before reading an item of interest.

Figure 6:
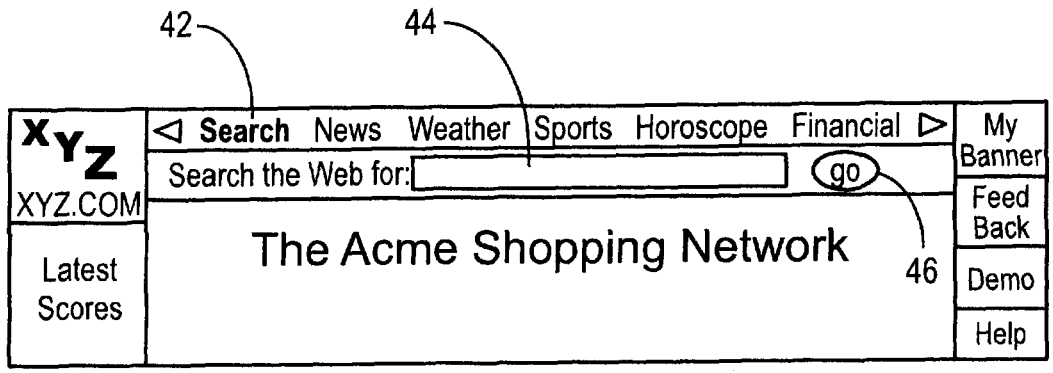
FIG. 6 is an illustration of the search configuration for the banner.
Figure 7:
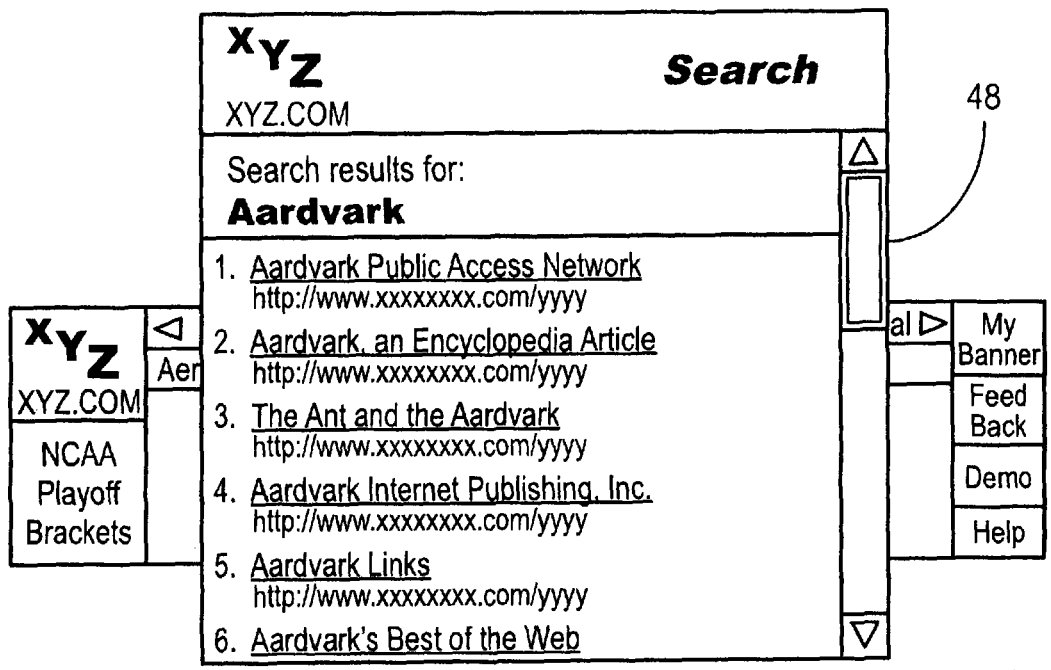
FIG. 7 is an illustration of a search results window.

Another choice which appears in the menu of content categories is a "Search" feature 42. If the user selects this choice, the scrolling headlines 34 are replaced by a text entry box 44, as shown in FIG. 6. By entering text into this box and then clicking on a "Go" button 46, the user is provided with the ability to search the Internet without having to leave his or her favorite website. The search might be carried out by a search engine that is specifically associated with the banner party, i.e. XYZ Corp. Alternatively, a drop-down menu (not shown) might be associated with this feature, via which the user can select one of the many available search engines to act upon the query which was entered. After clicking on the "Go" button 46, the designated search engine is accessed and the query is presented to it, to perform the search. The results of the search can appear in another pop-up window 48, as shown in FIG. 7.

Other capabilities that may be contained within the banner include the ability to conduct electronic commerce transactions (so-called e-commerce), and participate in community-type services. For instance, selection of an "e-commerce" category could cause the names of affiliated e-commerce retailers to scroll by, and the user can be linked to retailers of interest. Examples of the community services that are available include the ability to participate in a chat room, entering movie reviews and viewing those submitted by other users, participating in surveys, and the like. By selecting one of these categories, the user can be presented with a dialog box, for example in the space of the advertisement 26, to enter and/or read text. As another feature, a small screen could be displayed in a portion of the space for display of streaming video presentations, e.g. newscasts, movie trailers, etc.

One type of site that can be associated with the banner network, or which can function as a stand-alone site, provides manufacturer product information. This site can contain a comprehensive listing of available product lines. For each such product line, manufacturers provide copies of sales brochure and other product information is an electronic form, e.g. graphic files, Portable Document Format (PDF) files, or the like. For any product in which the user has an interest, the brochure can be viewed on-line, and/or downloaded for off-line display or printing.

Figure 8:
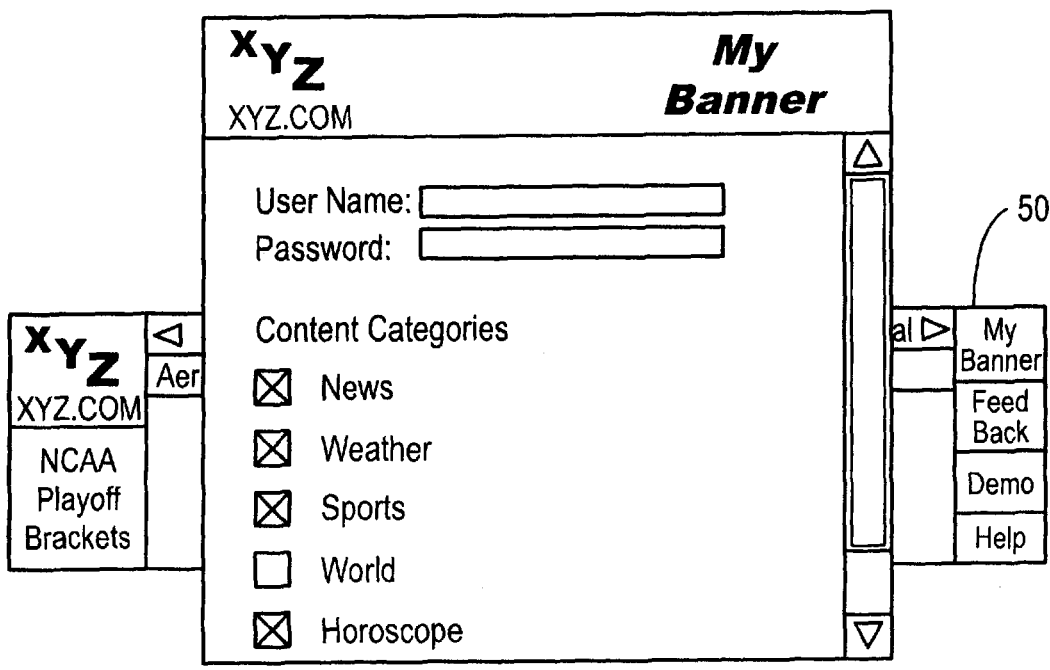
FIG. 8 is an illustration of a personalization window.

Preferably, the banner can be customized by the viewer to include only those categories of content which may be of interest. For this purpose, a button 50 on the banner provides the viewer with access to a personalization window, as shown in FIG. 8. This window lists the various categories of content that are available via the banner. The user can selectively check or uncheck each category, to thereby configure the banner to display only those categories which may be of interest.

To achieve this multi-function, portal-like capability for the banner site, the banner party, e.g. XYZ Corp., furnishes the web page publishing entity, ABC Inc., with HTML tag code that is incorporated into the published page and operates as a pointer to a designated web site of the banner party. In essence, the banner is displayed as a frame within the page of the publishing entity. One example of an HTML page containing code which establishes a frame having a height of 100 pixels at the bottom of the page is set forth below. In this example, the term "your_title_here" refers to the title of the page on which the banner is to appear, the term "your_entry_page_here" refers to the domain name of the publishing entity's web page within which the frame is to appear, the term "your_site_name_here" refers to a site name that is agreed upon between the publishing entity and the banner party, and the URL "xyz.emcweb.com" refers to the banner party's site at which the content of the banner is stored.

```
<html>
<head>
<title>your_title_here</title>
<script language="JavaScript">
<!--
function unnamewindow( ){
    self.name = '';
}
function hasSound( ) {
    if (!is_nav4up( )) return "true";
    var _hasSound = "false";
    for (var i = 0; i < navigator.plugins.length; i++) {
        if (navigator.plugins[i][0].type.indexOf('audio') > -1) {
            _hasSound = "true";
            break;
        }
    }
    return _hasSound;
}
function is_nav4up( ) {
    var agt = navigator.userAgent.toLowerCase( );
    var is_nav = ((agt.indexOf('mozilla')!=-1) &&
        (agt.indexOf('spoofer') = =-1)
        && (agt.indexOf('compatible') = = -1) && (agt.indexOf('opera') = =-1)
        && (agt.indexOf('webtv') = =-1));
    return (is_nav && (parseInt(navigator.appVersion) > = 4));
}
var boo1UA301Mac = (navigator.userAgent.indexOf('MSIE 3.01; Mac') != -1);
if (!boo1UA301Mac){
    self.name = 'opener';
    var theURL = unescape(top.location.href);
    var  writeIn = theURL.indexOf("?");
    var frame2 = theURL.substring(writeIn+"?".length,theURL.length);
    document.write(" < frameset border=0 rows='*,100' onUnload= 'unnamewindow( )'>");
    document.write(" < frame marginwidth=0 marginheight=0 src=");
    if (writeIn > = 1)
        document.write(frame2);
    else
```

-continued

```
    document.write("your_entry_page_here");
    document.write(" name='site' > ")
    document.write(" < frame marginwidth=0 marginheight=0
src='http://xyz.emcweb.com/xyzBannerIndex.jsp?audio=" +
                    hasSound( ) + "&site=your_site_name_here'
name='banner' scrolling='no' > ");
    document.write("</frameset>")
}
}
//-->
  </script>
</head>
<noscript>
<frameset rows="*,100" frameborder="no" >
<frame src="your_entry_page_here" name="site" marginwidth=0
marginheight=0>
<frame
src="http://zyz.emcweb.com/zyzBannerIndex.jsp?site=
your_site_name_here"
name="banner" scrolling="no" marginwidth=0 marginheight=0>
</frameset>
</noscript>
<noframes>
<body>
This page uses frames, but your browser doesn't support them.
</body>
</noframes>
</html>
```

At the banner party's site, additional code is stored which defines the content and functionality of the banner space, e.g. the appearance and location of the category menu, scrolling headline window, links, etc. In operation, whenever the user clicks on a particular link or menu item within the banner space, a file is accessed at the banner party's site, which contains the appropriate HTML code to cause the display to change accordingly. Thus, if the user clicks on one of the items in the menu 30, a file is downloaded which contains the headlines for that category. A script associated with the banner causes the individual headlines to then appear within the allotted space.

Figure 9:
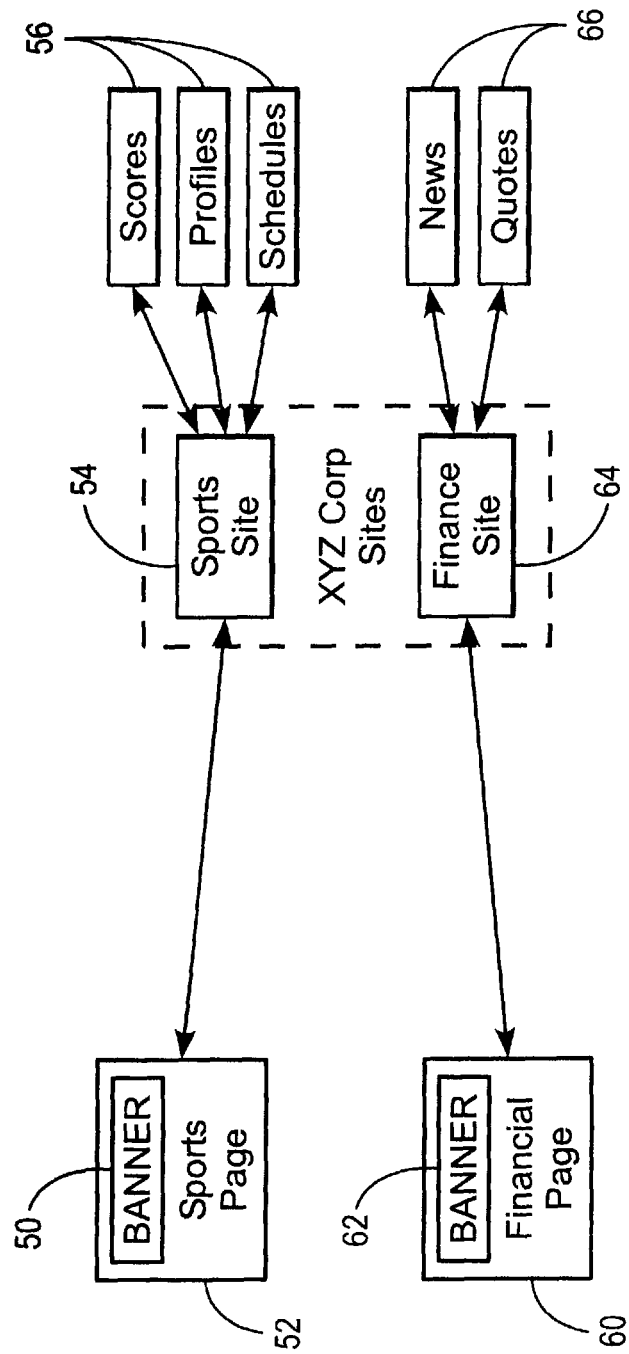
FIG. 9 is a block diagram of plural channels of networked banner sites.

As described previously, the sites that determine the content and functionality of the banners provided by the banner party, hereinafter referred to as "banner sites", form a network of integrated sites. Pursuant to another feature of the invention, these sites can be organized into different channels according to topic or audience groups, so that the specific site to which a banner refers may be oriented towards the context of the web page on which the banner appears. For example, as depicted in FIG. 9, a banner 50 which appears on a web page 52 that relates to sports can point to a banner site 54 of the banner party which also pertain to sports. In turn, this site can provide links to other sports-oriented sites 56, such as sites which provide scores, team profiles, schedules, etc. For this purpose, the original banner (illustrated in FIG. 3), contains links 58 to sites of related interest. In a manner similar to the headlines 34, each site might be displayed for a few seconds, after which the next link appears, in a scrolling fashion. The listed sites might be within the network of sports-related sites provided by XYZ Corp, and/or sites published by third parties.

Similarly, if the hosting web page 60 pertains to financial information, the banner 62 appearing on that page can refer to a banner site 64 of the banner party, which provides links to other sites 66 that display financial news, stock quotes, and the like. In all cases, however, the banners are branded with the identity of the banner party and present the same general look and feel, thereby providing a consistent user experience that is associated with the banner party. The dissemination of the appropriate banners to the proper sites can be controlled by the banner servers.

In the preceding examples, the banner party has its banner hosted by other entities on their web pages. Of course, it is also possible for the banner party to host its own web site, and display the multi-functional banner on the pages of that site. In this case, the banner party, e.g. XYZ.Com, can interact directly with end users, and provide incentives for the end users to visit its site. For instance, if an Internet user agrees to use the banner party's home page as a "certified start page", the user can be issued a number of shares of stock in the banner party. By "certified start page" is meant that the user agrees that the initial site to which the user connects whenever his or her browser is launched, or access is otherwise gained to the Internet, will be the home page for the banner party.

As one example, the user might be given four shares of an interim class stock if the user agrees to use XYZ.Com as its certified start page. If the user further agrees to obtain an e-mail address that is affiliated with XYZ.Com, an additional four shares of interim class stock are issued to the user. As a further incentive, if the user agrees to employ XYZ.Com as its Internet service provider, an additional number of interim class shares can be issued.

Four shares of the interim class stock can be equal to one share of Class A stock in XYZ Corp. The interim class stock can vest in the user on a graduated scale. For instance, 25% of the interim class stock can vest after a first period of continued use of the XYZ.Com start page or e-mail address, with additional percentages vesting after longer periods of continuous use. The user's compliance with the agreement to use the start page and e-mail address can be confirmed by sending an e-mail message to stockholders on a regular basis, e.g. monthly. In response to the message, the stockholders must visit the XYZ.Com web site within a certain period of time, and reply to the message. For each month in which no reply is received, the user loses one share of unvested stock.

As a further form of enticement to users, the banner party can offer instant rewards for current viewers. For example, the screen names of users who have registered with XYZ.Com for any of its services can scroll across the screen on a random basis. The name might appear within the banner 24, or elsewhere on the web page of XYZ.Com or an affiliated site. If the users click their names while they appear on the screen, they become instant winners, and receive a free product that is being offered by the banner party to those registered users.

From the foregoing, therefore, it can be seen that the features of the present invention provide a consistent and comprehensive approach to the use of banners on web pages. By obtaining the continuing right to display banners on a multiplicity of web sites, the banner party can provide a wide-reaching network of banners that bring a large variety of content from various third-party information sources and service providers to the end user, through a single portal. While the invention has been described with reference to specific examples, it will be appreciated that its principles are applicable to a variety of different situations other than those specifically described herein.

What is claimed is:

1. A method for execution in an electronic network, the electronic network having a communication device, a first server having at least one first website hosted thereon, and a second server having at least one second website, the second website providing a multi-function portal banner for display as a persistent source of content for users of the communication device when viewing one or more web pages of the first website, the method comprising the steps of:

publishing at least one file containing content for the portal banner on the second server for the second website, said at least one file defining a network of integrated banners, wherein the display and content of any one or more of the integrated banners is determined by a compensation structure defined between owner entities of each of the first website and second website, and a determination of the content of the one or more web pages of the first website on which the portal banner appears; and providing a personalization option for the viewing user to customize and configure the display content of the portal banner in a web browser of the communication device and to specifically identify one or more information and service content that is presented each time the portal banner is displayed.

2. The method of claim 1, wherein the compensation structure determines, during the rendering of the first website, the location at which the portal banner appears on the first entity's web site page.

3. The method of claim 2, wherein the compensation structure determines the frequency at which the portal banner appears on each of the first web site.

4. The method of claim 2, wherein the compensation structure determines the size of the portal banner appears on each of the first web site page.

5. The method of claim 1 wherein the portal banner appears on every page of the first web site.

6. The method of claim 5 wherein the portal banner further includes a search function which enables a user to conduct a search from the banner for information of interest in the Internet.

7. The method of claim 5 wherein the portal banner further includes a community services category which presents a dialog box in which a user can enter text for viewing by other users and view text entered by other users.

8. The method of claim 5 wherein the portal banner further includes a link that provides access to a web site that contains a listing of product lines, and individual manufacturer information about products in each product line.

9. The method of claim 8 wherein said manufacturer information comprises graphical files of product brochures.

10. The method of claim 5, wherein the portal banner further includes a link that provides access to a web site that provides e-commerce services.

11. The method of claim 1 wherein the portal banner provides access to a plurality of different categories of informational content.

12. The method of claim 11 wherein the categories are displayed to a user by means of a menu within the portal banner, and are individually selectable by the user from the menu at the time of viewing.

13. The method of claim 12 wherein the portal banner displays individual headlines associated with a selected category of informational content in a scrolling manner.

14. The method of claim 13 wherein said headlines are stored in a file that is downloaded to a user's site when the user selects the category associated with the headlines.

15. The method of claim 13 wherein each displayed headline comprises a link to a file which contains the content associated with the headline, and which is displayed to the user when the user clicks upon the headline while it is displayed.

16. The method of claim 13 wherein the portal banner further includes a link to cause all of the headlines associated with a selected category to be displayed for viewing by the user.

* * * * *